(12) United States Patent
Baker

(10) Patent No.: US 6,407,346 B1
(45) Date of Patent: Jun. 18, 2002

(54) ROTARY CHECK WEIGHER

(75) Inventor: Tony D. Baker, Hudson, OH (US)

(73) Assignee: Advanced Poly-Packaging, Inc., Akron, OH (US)

( * ) Notice: Subject to any disclaimer, the term of this patent is extended or adjusted under 35 U.S.C. 154(b) by 0 days.

(21) Appl. No.: 09/548,836

(22) Filed: Apr. 13, 2000

(51) Int. Cl.$^7$ .................. G01G 13/22; G01G 13/02; B07C 5/24; B07C 5/16
(52) U.S. Cl. .................. 177/83; 177/119; 177/121; 177/123; 209/645; 209/646; 209/919
(58) Field of Search .................. 177/50, 51, 119, 177/120, 121, 122, 123, 145, 83, 84; 209/592, 645, 646, 919

(56) References Cited

U.S. PATENT DOCUMENTS

| | | | | |
|---|---|---|---|---|
| 3,539,028 A | * | 11/1970 | Krolopp | 177/83 |
| 4,531,597 A | * | 7/1985 | Focke et al. | 177/84 |
| 4,765,488 A | * | 8/1988 | Moriarity | 177/123 |

* cited by examiner

*Primary Examiner*—Randy W. Gibson
(74) *Attorney, Agent, or Firm*—Renner, Kenner, Greive, Bobak, Taylor & Weber

(57) ABSTRACT

A check weigher for a bagging system includes a compartmentalized rotatable drum positioned immediately beneath a chute receiving bags from a conveyor system of a bagger. The rotatable drum is maintained upon a scale adapted to determine the tare weight of the bag and its contents. A receptacle is positioned on each side of the rotatable compartmentalized drum. A reversible stepping motor is connected to and is operative to drive the drum. A controller is interposed between the stepping motor and the scale. When the controller determines that the weight indicated by the scale is within an acceptable range of weights, the compartmentalized drum is rotated in a first direction, causing the bag to be deposited in a first acceptable drum, while simultaneously positioning a new compartment beneath the chute. In the event the weight is unacceptable, the reversible stepping motor causes the drum to rotate in an opposite direction, causing the unacceptable bag to be deposited in a second bin, while simultaneously positioning a new compartment beneath the chute.

4 Claims, 1 Drawing Sheet

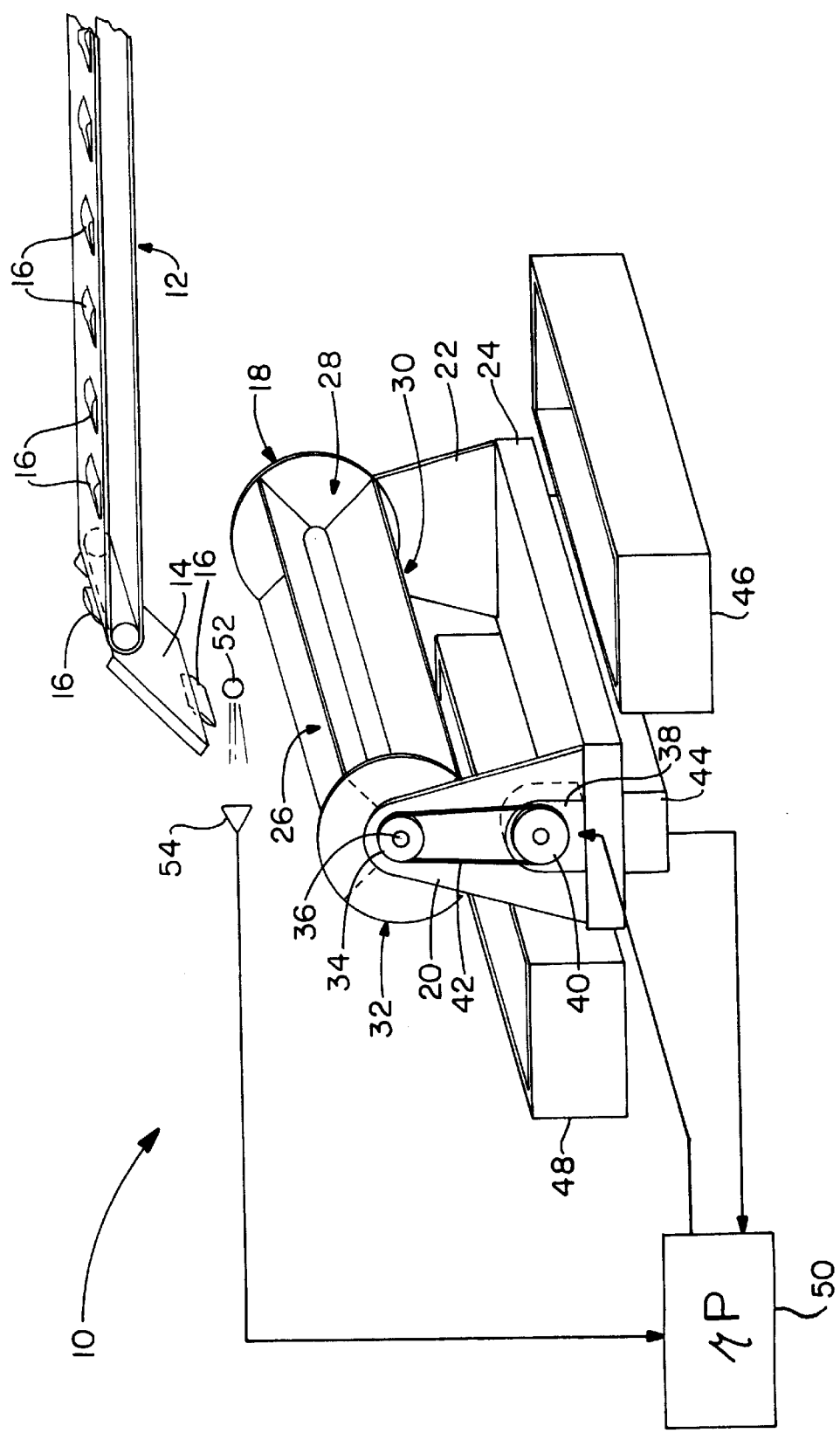

ROTARY CHECK WEIGHER

TECHNICAL FIELD

The invention herein resides in the art of packaging equipment and, more particularly, to a device employed for checking the contents of packages by weight. Specifically, the invention relates to a rotary drum positioned beneath the conveyor of a bag packaging system and adapted to receive individual bags, check the weight of the bag and its contents, and by controlling the direction of rotation of the drum, either accept or reject the bag based upon comparison of the weight to a set criteria.

BACKGROUND ART

The use of bagging machines is now widely accepted as a method for depositing a volume of parts or other materials into a bag for ultimate sale or subsequent combination with subassemblies for final packaging. It is well known that nuts, bolts, screws, cotter pins, caps, and the like are often packaged in bags by the use of bagging machines for such ultimate use or distribution. Typically, such bags are filled with a state of the art bagging machine which is generally programmed to deposit specified numbers of various pieces into the bags. While bagging equipment is generally quite accurate, errors in the count do occur and, accordingly, it is necessary to provide a device for checking the contents of the bag as a means of quality control. For this purpose, various types of scales or weight checkers have been devised for determining, by weight, the likelihood of a bag having the appropriate number or combination of parts therein. In general, such check weighers have an associated window of acceptable weight and, if a bag is found to fall within that window, it is accepted. Such check weighers are generally known and widely used.

The prior art check weigher has typically allowed a conveyor of the bagging system or bagger to drop on a top plate of a scale across which a pair of orthogonally positioned reciprocating push plates are positioned. If the weight of the bag and its contents falls within the acceptable window, one of the push plates is extended across the scale and pushes the bag in a first direction where it is received in a bin for acceptable bags. The push plate is then retracted. In the event the bag and its contents falls outside the window, the other orthogonally positioned push plate is extended to push the bag and its contents into a second bin for unacceptable bags. That plate is then similarly retracted. While such prior art check weighers have generally been acceptable in implementation, it has been found that their operation is unnecessarily slow, so the accept/reject push plates, which are typically actuated by solenoids or air cylinders, must necessarily pass through a complete reciprocating cycle in order to effect the accept/reject operation. In other words, each push plate must both extend and retract before a subsequent bag of materials can be placed upon the surface of the scale plate. Often, the check weigher is the slowest operating mechanism in the total bagging system and, accordingly, the required dual action of prior art check weighers has unnecessarily impeded the operation of otherwise high speed bagging systems.

There is a need in the art for a check weigher which requires a single action to accept or reject a bag of materials and, upon such acceptance or rejection, is immediately available for receipt of a subsequent bag.

DISCLOSURE OF INVENTION

In light of the foregoing, it is a first aspect of the invention to provide a check weigher for bagging systems in which the actuating mechanism moves in only one direction during an accept or reject cycle.

Another aspect of the invention is the provision of a check weigher for bagging systems which is ready for receipt of another bag immediately upon depositing a prior bag of materials into an accept or reject bin.

Still another aspect of the invention is the provision of a check weigher for bagging systems which eliminates the need for a pair of orthogonally positioned push plates for the accept/reject operation.

Yet another aspect of the invention is the provision of a check weigher for bagging systems which is easy to operate and control, which can be readily constructed with state of the art apparatus and techniques, and which is given to ease of implementation with presently existing bagging systems.

The foregoing and other aspects of the invention which will become apparent as the detailed description proceeds are achieved by a rotary weighing system, comprising: a conveyor transporting bags of parts; and a compartmentalized drum positioned beneath said conveyor to receive bags dropped therefrom.

Other aspects of the invention which will become apparent herein are attained by a method for accepting and rejecting bags of materials based on weight, comprising: dropping of a bag of materials into a rotatable drum; determining the weight of the bag of materials received by the rotatable drum; selectively rotating the drum in a direction determined by the weight of the bag of materials; and receiving said bag of materials in a first area when the drum is rotated in a first direction and in a second area when said drum is rotated in a second direction.

DESCRIPTION OF THE DRAWING

For a complete understanding of the objects, techniques and apparatus of the invention reference should be made to the following detailed description and accompanying drawing wherein there is shown a perspective view of a check weigher for bagging systems in accordance with the invention.

BEST MODE FOR CARRYING OUT THE INVENTION

Referring now to the drawing, it can be seen that a rotary check weigher for bagging systems made in accordance with the invention is designated generally by the numeral 10. As shown, a conveyor 12 associated with a typical bagger extends from the bagger to a chute 14 and is operative to convey bags 16 containing an array of parts or other materials placed therein by the bagger. A drum 18 is positioned immediately beneath the chute 14, as shown. The drum 18 is rotatably mounted between a pair of end brackets 20, 22 which extend upwardly from an appropriate base member 24. It will be appreciated that an axle 36 extends between the brackets 20, 22 and supportingly maintains the drum 18 in a position beneath the chute 14 to receive bags 16 as they are sequentially dropped therefrom.

As further shown in the drawing, drum 18 is compartmentalized. In the preferred embodiment of the invention, the drum 18 is divided into four troughs or compartments 26, 28, 30, 32. Each compartment consumes an arc of 90° of the drum and is generally wedge shaped in cross section from the outer circumference of the drum 18 to the axle 36. Of course, those skilled in the art will appreciate that any number of troughs or compartments may be selected and that they may be configured with a flat bottom rather than an apex such as those shown in the drawing as they terminate at the axle 36.

A pulley wheel 34 is mounted to the axle 36 adjacent the end bracket 20. A stepping motor 38, or other appropriate servo or control motor is mounted near the bottom of the bracket 20 and has connected to the shaft thereof a pulley wheel 40. A belt 42 passes over the pulleys 34, 40 such that the motor 38 can rotatably drive the drum 18. Of course, those skilled in the art will appreciate that the axle 36 is mounted in appropriate bearings or bushings for this purpose.

As further shown in the drawing, the base 24 is mounted upon the weight scale 44 such that the scale 44 weighs the system comprising elements 18–42 as just described. Additionally, the scale 44 would also weigh any bag 16 received by a compartment 26–32 of the drum 18. In accordance with the preferred embodiment of the invention, the scale 44 is "zeroed" at the weight of the elements 18–42, such that only the weight of the bags 16 and their contents are weighed by the scale 44. Accordingly, only the tare weight of the bags 16 and their contents are monitored by the scale 44.

A first receptacle 46 is positioned on one side of drum 18 and a second receptacle 48 on the other, as illustrated. The receptacle or bin 46 is intended to receive bags 16 which are of an acceptable weight, while the bin 48 is positioned to receive bags that fall outside an acceptable weight window.

Also included as a part of the system 10 is an appropriate controller such as a microprocessor 50 which communicates with both the scale 44 and the stepping motor 38. The microprocessor 50 is adapted to receive a signal 44 corresponding to the tare weight of a bag 16 received in a compartment 26–32 of the drum 18. The microprocessor 50 then compares that weight reading with a window of acceptable weight for such bags and, depending upon whether the weight falls within or without the window, the microprocessor 50 causes the stepping motor 38 to rotate through a fixed arc corresponding to either acceptance or rejection of the bag 16. For the preferred embodiment illustrated, the stepping motor 38 would cause the drum 18 to rotate 90° in either direction. That amount of rotation would effectively index the next adjacent compartment to be positioned immediately beneath the chute 14, while also allowing the bag 16 contained in the compartment to be deposited in the appropriate bin 46, 48. Of course, if a different number of troughs or compartments 26–32 were employed, the amount of rotation effected by the stepping motor 38 would be correspondingly changed.

Finally, it will be appreciated that the system 10 may include an appropriate detector to advise the microprocessor 50 when a bag 16 has left the chute 14 for receipt by the drum 18. In this regard, a photodetector assembly, comprising a light source 52 and a receiver 54 may be employed. Each bag 16, as it leaves the chute 14, passes through and breaks the light beam between the source 52 and receiver 54, causing a signal to be passed to the microprocessor 50, indicating that a bag has been received by the drum 18.

In use, the bags 16 move along the conveyor belt from an appropriate bagger at a generally uniform rate of speed. As a bag 16 passes through the detector 52, 54, the microprocessor 50 is readied for receiving a signal from the scale 44 indicative of the weight of the bag 16 and its contents as received in, for example, the compartment 26 of the drum 18 positioned immediately below the chute 14. If the signal from the scale 44 passed to the microprocessor 50 corresponds to a weight within an acceptable window, or favorably satisfying a threshold, the microprocessor 50 causes the stepping motor 38 to rotate clockwise, allowing the bag 16 to pass from the sloped walls of the compartment 26 into the bin 46 and thus positioning the compartment 30 immediately beneath the chute 14 for receipt of the next bag. In the event the bag 16 received by the compartment 26 falls outside the window of acceptable weight, the stepping motor 38 causes the drum 18 to rotate counterclockwise, allowing the bag 16 to slide from the sloped walls of the compartment 26 and into the bin 48. In such an instance, the compartment 28 is then positioned immediately beneath the chute 14 for receipt of the next bag 16. Thus, whether the bag is accepted or rejected, the movement of the drum 18 to deposit the bag in the appropriate bin 46, 48 immediately positions the next adjacent compartment 26–32 immediately beneath the chute 14 for receipt of the next bag 16. There is no requirement for a return operation of the drum 18 to a "home" position. Accordingly, the system 10 operates much faster than previously known systems of the prior art.

Thus it can be seen that the objects of the invention have been satisfied by the structure and method presented above. While in accordance with the patent statutes only the best mode and preferred embodiment of the invention has been presented and described in detail, the invention is not limited thereto or thereby. Accordingly, for an appreciation of the true scope and breadth of the invention, reference should be made to the following claims.

What is claimed is:

1. A rotary weighing system, comprising:
   a conveyor transporting bags of parts;
   a compartmentalized drum positioned beneath said conveyor to receive bags dropped therefrom;
   a scale receiving and supporting said compartmentalized drum;
   a reversible stepping motor for selectively rotating said compartmentalized drum, said motor selectively rotating said compartmentalized drum in selected directions;
   a controller interconnected between said scale and said reversible stepping motor, said controller effecting a direction of rotation of said reversible stepping motor as a function of a weight measured by said scale; and
   a sensor interposed between said conveyor and said compartmentalized drum and in communication with said controller, said sensor monitoring the passage of bags from said conveyor to said compartmentalized drum and enabling said controller to receive a signal indicative of the weight of each bag passed from said conveyor to said compartmentalized drum.

2. The rotary weighing system according to claim 1, wherein said controller comprises a microprocessor.

3. The rotary weighing system according to claim 1, further comprising first and second receptacles positioned on opposite sides of said compartmentalized drum, said first receptacle receiving bags from said compartmentalized drum evidencing an acceptable weight and said second receptacle receiving bags evidencing an unacceptable weight.

4. The rotary weighing system according to claim 3, wherein said drum is divided into four compartments.

* * * * *